United States Patent
Henkel

(10) Patent No.: US 8,165,267 B2
(45) Date of Patent: Apr. 24, 2012

(54) METHOD AND DEVICE FOR CHECKING CARRY-ON LUGGAGE AND OTHER CARRIED OBJECTS

(75) Inventor: Rainer Henkel, Schweppenhausen (DE)

(73) Assignee: Smiths Heimann GmbH, Wiesbaden (DE)

( * ) Notice: Subject to any disclaimer, the term of this patent is extended or adjusted under 35 U.S.C. 154(b) by 414 days.

(21) Appl. No.: 11/898,202

(22) Filed: Sep. 10, 2007

(65) Prior Publication Data

US 2008/0083661 A1 Apr. 10, 2008

Related U.S. Application Data

(63) Continuation of application No. PCT/EP2006/001927, filed on Mar. 3, 2006.

(30) Foreign Application Priority Data

Mar. 10, 2005 (DE) .................... 10 2005 011 054

(51) Int. Cl.
*G01N 23/04* (2006.01)

(52) U.S. Cl. ............................................. 378/57; 378/4
(58) Field of Classification Search ........................ None
See application file for complete search history.

(56) References Cited

U.S. PATENT DOCUMENTS

| 5,182,764 | A |   | 1/1993 | Peschmann et al. |
| 5,600,303 | A | * | 2/1997 | Husseiny et al. .......... 340/568.1 |
| 5,642,393 | A | * | 6/1997 | Krug et al. ..................... 378/57 |

FOREIGN PATENT DOCUMENTS

| DE | 19954662 A1 | 6/2001 |
| GB | 2359720 A | 8/2001 |
| WO | WO-03/067770 A | 8/2003 |

* cited by examiner

*Primary Examiner* — Hoon Song
(74) *Attorney, Agent, or Firm* — Muncy, Geissler, Olds & Lowe, PLLC

(57) ABSTRACT

A method and device is provided for controlling a hand luggage and other objects carried by flight passengers during check-in, wherein the complexity of an object is determined in a first verifying device by automatic verification. Afterwards, supplementary verification steps are carried out according to the determined complexity.

8 Claims, 3 Drawing Sheets

METHOD AND DEVICE FOR CHECKING CARRY-ON LUGGAGE AND OTHER CARRIED OBJECTS

This nonprovisional application is a continuation of International Application No. PCT/EP2006/001927, which was filed on Mar. 3, 2006, and which claims priority to German Patent Application No. DE 102005011054, which was filed in Germany on Mar. 10, 2005, and which are both herein incorporated by reference.

BACKGROUND OF THE INVENTION

1. Field of the Invention

The present invention relates to a method and a device for checking carry-on luggage and other objects carried by flight passengers during check-in.

2. Description of the Background Art

Many methods and devices are known for inspecting carry-on luggage and other objects that flight passengers carry with them during check-in. Thus, as is well known, x-ray inspection systems for carry-on luggage and metal detectors for scanning people are fixedly installed at airports, to check flight passengers and their carry-on luggage for security-relevant objects such as weapons, explosives, etc.

X-ray inspection systems are also known that permit automatic detection of explosives in closed containers. Thus, German Patent Application No. DE 199 54 662 describes an x-ray inspection system for detecting prohibited objects in items, said system that in a first examination stage determines locations that are analyzed more precisely in a second stage with use of x-ray diffraction. U.S. Pat. No. 5,182,764 discloses an inspection system for pieces of luggage, in which the inspected object is irradiated in a first stage by an x-ray scanner. Its results are used to determine locations that are imaged in a subsequent computed tomography (CT).

Conventional multistage automatic inspection systems are utilized for checking checked-in luggage. Because of the size, high cost, possible low throughput, and high maintenance cost, these systems are less suitable, however, for examining carry-on luggage and objects carried by passengers (e.g., articles of clothing) during a check-in at airports. Increasing the throughput by parallization of several systems is not a realistic option for reasons of space and cost.

Pieces of luggage can be divided into classes of different complexity in regard to inspection by means of x-ray inspection systems. Whereas larger pieces of luggage checked in by the flight passenger predominantly have a very complex content, the complexity of carry-on luggage and other objects carried by a flight passenger varies considerably. Thus, jackets or other outer clothing, typically inspected placed in trays, are less complex and relatively simple to inspect. In the case of carry-on luggage, for example, briefcases, the complexity varies depending on their content. According to experience, carry-on luggage consists of 30%-50% simple and 50%-70% complex objects. This circumstance is utilized according to the invention to reduce the number of items for which a laborious and thereby intensive inspection must be performed.

SUMMARY OF THE INVENTION

It is therefore an object of the present invention to provide a method and a device for checking carry-on luggage and carried objects, which enable a complete inspection of the carry-on luggage and all carried objects and can be integrated into the check-in process.

This object is attained according to the invention by automatically determining the complexity of an object in a first inspection device and then depending on the determined complexity performing various other inspection steps.

Preferably, a prescanner operating according to the x-ray absorption principle is used for the automatic complexity determination. It is connected to control and evaluation electronics, which contain an algorithm that determines a degree of complexity of the object to be inspected on the basis of data from the prescanner. Different parameters may be used to determine the degree of complexity, for example, the local and overall x-ray absorption in the object, the proportion and size of materials, imaged by the x-rays, in the object, the thickness of the imaged materials in the object, and/or the proportion of structured or nonhomogeneous areas in the x-ray image, therefore whether the x-ray image is divided locally into many small different regions.

Preferably, an image that is shown to an operator is produced from the prescanner x-ray data. This makes it possible for an operator to perform at the same time an inspection with the prescanner data.

Preferably, in an object classified as simple, the items present therein are automatically evaluated in the first step. If the automatic evaluation classifies an item as suspicious, the operator can clarify this suspicion directly. The automatic evaluation, whether suspicious or unsuspicious, can also be omitted in favor of a mere operator decision. Further inspections are omitted for an object with solely unsuspicious items. Advantageously, these objects can be transported in an expedited manner further through the other inspection devices by the conveying device without further inspection. Likewise, these objects can be transported advantageously past the other inspection devices, particularly when the other inspection devices are still occupied by the analysis of preceding objects. Simple objects that cannot be evaluated as unsuspicious and objects that are classified as complex are transported by the conveying device to the subsequent inspection devices and there analyzed more intensively. To increase the efficiency, this analysis can be performed only at suspicious locations, determined in the prescanner stage and passed on to subsequent inspection devices in a known manner. These additional stages can be, for example, a diffraction stage or a CT scanner, but also devices based on all other principles.

Simple objects classified as suspicious by the prescanner can be conveyed directly to reinspection, when a manual inspection requires less effort than another automatic inspection (e.g., in the case of articles of clothing).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
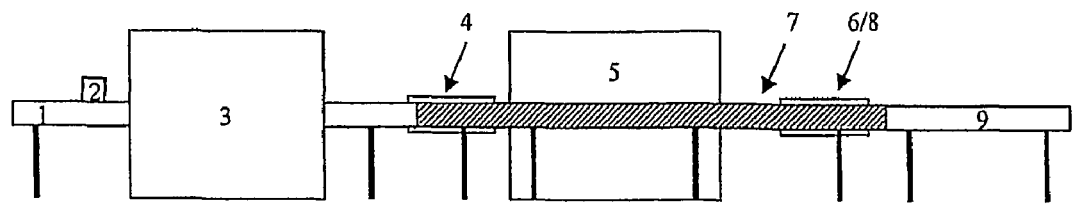
FIG. 1 shows a side view of an inspection system, according to an embodiment of the present invention.

The inspection systems shown in the drawing are used to inspect carry-on luggage and other carried objects, which passengers wish to take onto the airplane at check-in. Pieces of carry-on luggage, such as handbags or notebook computers, are placed directly in the apparatus; smaller objects such as articles of clothing, cell telephones, or keys are placed previously in trays or tubs of a known type.

In the depicted designs of the invention, the inspection system in each case begins with a first conveying device 1, on which the object to be inspected (here a piece of luggage 2) is placed and then transported to a first inspection device 3. There, the piece of luggage 2 is irradiated by an arrangement of x-ray generators and in each case opposite rows of detectors. The control and evaluation electronics (not shown here) determine from the obtained data the complexity of the piece of luggage 2 and evaluate simple inspection items in the piece of luggage 2. In another design, locations where explosives could be present can be identified in complex inspection items in pieces of luggage. In addition, the determined data are converted to an image and shown to the operator on a display unit, which is not shown here. When both the evaluation electronics and the operator release the piece of luggage 2, sorting unit 4 makes sure that the piece of luggage 2 is transported without a delay via conveying device 7 past the second inspection device 5 and removed from the line and thus can be removed by the passenger at reclaim location 9.

After the prescanner 3, still uncleared items are introduced by conveying device 1 via sorting unit 4 into a second inspection device 5 and there analyzed intensively, or they are conveyed via a sorting device 6 directly to a reinspection location 8 for a manual reinspection. For this purpose, both conveying devices 1, 7 are rejoined behind second inspection device 5. Second sorting device 6 then follows, from which the objects are conveyed alternatively to reinspection location 8 or directly to reclaim location 9.

If possible locations of explosives were determined in prescanner 3, the more laborious inspection in inspection device 5 can be limited to these locations. If the inspection is negative, the piece of luggage is transported to reclaim location 9 and can be reclaimed by the passenger. If the evaluation electronics identify an explosive or if a clear decision is not possible, the operator receives a notice and the piece of luggage 2 is transported via sorting device 6 to reinspection location 8.

During the time when the inspection proceeds in inspection device 5, the control electronics can already arrange for the next object to be inspected to be transported via conveying device 1 to prescanner 3. At best, inspection step 5 is omitted for this object (piece of luggage 2) and, while the preceding object is still being checked in second inspection device 5, it can be transported via conveying device 7 to reclaim location 9 and there reclaimed by the passenger.

Alternatively, conveying device 7 can be omitted, e.g., for reasons of space. Then the objects that were already cleared in prescanner 3 are transported in an expedited manner and without inspection through second inspection device 5. The option of moving simple objects past an occupied inspection device 5 would then be dispensed with.

Figure 2:
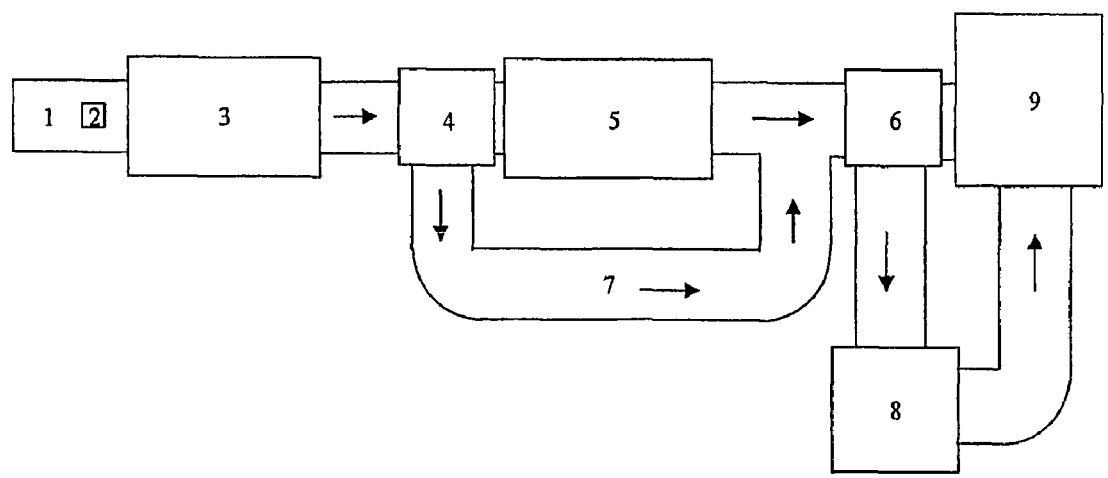
FIG. 2 shows a plan view of the inspection system of FIG. 1.

The embodiment according to FIGS. 1 and 2 contains only one inspection line in which the objects are checked. In the embodiment according to FIG. 3, two inspection lines 10, 11 are advantageously arranged, which share second inspection device 5. For this purpose, shared second inspection device 5 is arranged between the two inspection lines 10, 11. The other elements of the two inspection lines (first inspection device 3, conveying devices 1, 7, sorting devices 4 and 6, reinspection location 8, and reclaim location 9) are arranged as a mirror image to one another. Different from the embodiment according to FIGS. 1 and 2, conveying devices 7, by which the objects can be conveyed past second inspection device 5, can proceed in a straight line from first inspection device 3 to second sorting device 6. Conveying device 1 of each inspection line 10, 11 proceeds in each case behind first sorting device 4 in an arc to shared inspection device 5 and behind inspection device 5 again in an arc back to the respective second sorting device 6.

Figure 3:
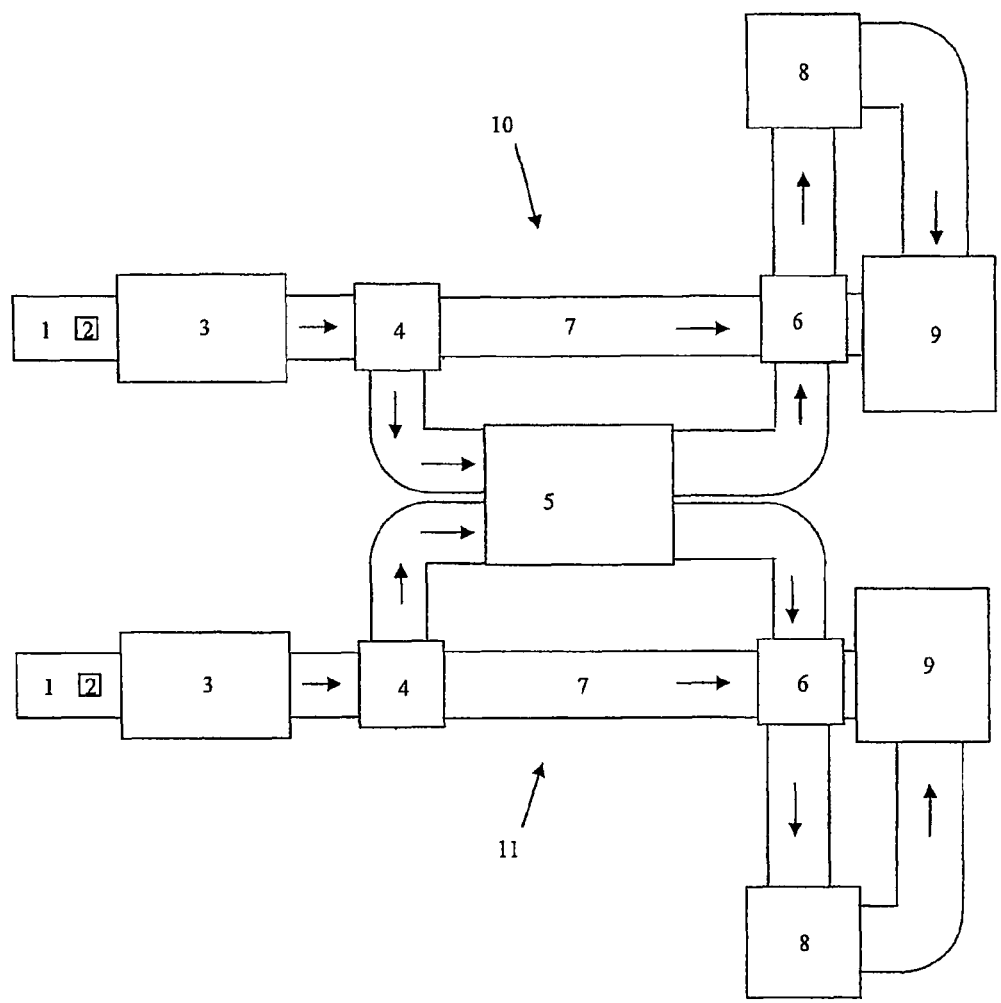
FIG. 3 shows the plan view of an inspection system with two inspection lines.
Figure 4:
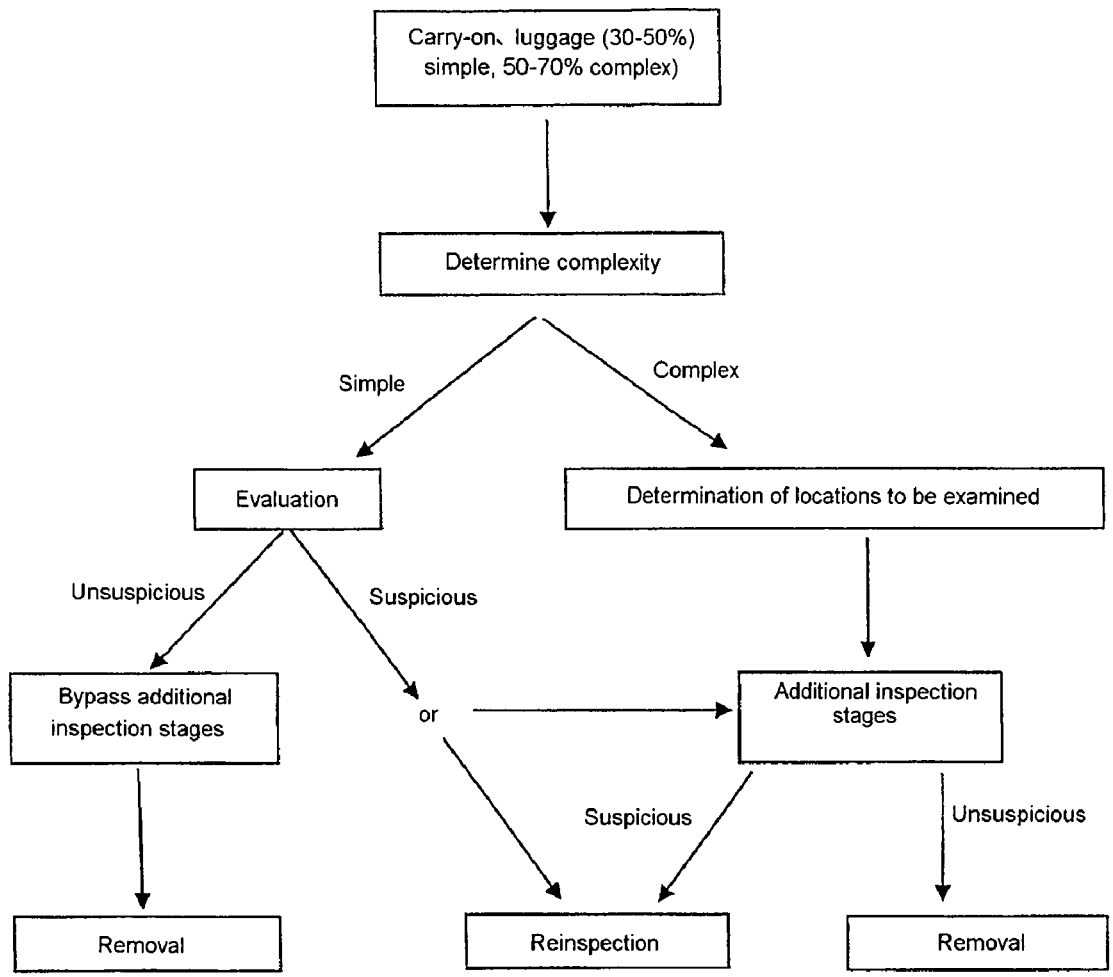
FIG. 4 shows a schematic view of the process.

The embodiment according to FIG. 3 enables an efficient utilization of the laborious and expensive second inspection device 5. This is possible particularly when the proportion of objects classified as simple is high. If the proportion of complex objects is extremely low, more than two inspection lines can share a single second inspection device 5. The shared utilization of an inspection device 5 by several inspection lines is limited by the circumstance that invariably only one object can be inspected in inspection device 5. The control of conveying device 1 therefore occurs so that objects are conveyed to inspection device 5 only when it is not occupied.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for checking carry-on luggage and other objects carried by flight passengers during check-in, the method comprising:
   providing a first inspection device;
   automatically determining, via the first inspection device, a complexity of the object in regard to an inspection; and
   performing, based on the determined complexity, further inspection procedures, wherein the complexity of the object is determined based on: local and overall x-ray absorption in the object; a proportion and size of materials imaged by x-rays in the object; or a thickness of the imaged materials in the object, and
   wherein the complexity of the object is also determined based on a proportion of structured or nonhomogenuous areas in an x-ray image.

2. The method according to claim 1, wherein, in the first inspection device, the objects are automatically evaluated at substantially a same time as being suspicious or unsuspicious.

3. The method according to claim 2, wherein complex objects or objects evaluated as suspicious are supplied to other inspection processes, and wherein simple objects classified at the same time as unsuspicious are removed directly.

4. The method according to claim 2, wherein in the case of complex or suspicious objects the locations of suspicious items present in the object is determined by the first inspection device and these locations are provided to the subsequent inspection devices.

5. The method according to claim 1, wherein the complexity of the object in regard to inspection indicates whether the object will be simple or complex to subsequently inspect for security-relevant objects.

6. The method according to claim 1, wherein the further inspection procedures performed based on the determined complexity include determining whether the object is suspicious or unsuspicious.

7. The method according to claim 1, wherein the first inspection device is provided for prescreening objects before inspection for security-relevant objects.

8. The method according to claim 1, further comprising:
   providing a second inspection device downstream from the first inspection device; and
   evaluating, in the second inspection device, the objects as being suspicious or unsuspicious following the determination with regard to complexity.

\* \* \* \* \*